US010636066B2

(12) United States Patent
Proietti et al.

(10) Patent No.: US 10,636,066 B2
(45) Date of Patent: *Apr. 28, 2020

(54) SYSTEM AND METHOD FOR LOCATION AND TIME SPECIFIC MOBILE COMMERCE (71) Applicant: Emma Proietti, New York, NY (US)

(72) Inventors: Emma Proietti, New York, NY (US); Mario Proietti, Fullerton, CA (US); John Thomas Moring, Encinitas, CA (US)

(73) Assignee: Emma K. Proietti, New York, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 15/795,153

(22) Filed: Oct. 26, 2017

(65) Prior Publication Data
US 2018/0047077 A1 Feb. 15, 2018

Related U.S. Application Data (63) Continuation of application No. 14/261,227, filed on Apr. 24, 2014, now Pat. No. 9,830,625.

(60) Provisional application No. 61/816,567, filed on Apr. 26, 2013.

(51) Int. Cl.
G06Q 30/06 (2012.01)

(52) U.S. Cl.
CPC ..... *G06Q 30/0601* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 6,873,970 B2 | 3/2005 | Showghi et al. | |
| 7,174,308 B2 | 2/2007 | Bergman et al. | |
| 7,424,447 B2 | 9/2008 | Fuzell-Casey et al. | |
| 7,496,527 B2 | 2/2009 | Silverstein et al. | |
| 8,010,411 B2 | 8/2011 | Woodward et al. | |
| 8,805,729 B2 | 8/2014 | Afram et al. | |
| 8,880,428 B2 | 11/2014 | Woodward et al. | |
| 9,373,091 B1 | 6/2016 | Belser et al. | |
| 9,495,701 B2 | 11/2016 | Bressan et al. | |
| 9,830,625 B2 * | 11/2017 | Proietti | G06Q 30/0601 |
| 2002/0038259 A1 | 3/2002 | Bergman et al. | |
| 2003/0014330 A1 | 1/2003 | Showghi et al. | |
| 2004/0039661 A1 | 2/2004 | Fuzell-Casey et al. | |
| 2004/0093281 A1 | 5/2004 | Silverstein et al. | |
| 2007/0055439 A1 | 3/2007 | Denker et al. | |
| 2007/0136149 A1 | 6/2007 | Woodward et al. | |

(Continued)

OTHER PUBLICATIONS

IBM Technical Disclosure RD-442108, Issue No. 442, p. 276, Jan. 20, 2001.

*Primary Examiner* — Nicholas D Rosen
(74) *Attorney, Agent, or Firm* — Lewis Roca Rothgerber Christie LLP (57) ABSTRACT Method for location and time specific commerce includes receiving an event request from a user using a mobile device; verifying an account of the user; obtaining a location of the user; obtaining a date and time of the request; retrieving merchandising information from one or more databases, according to the location of the user and said date and time of the request; and transmitting said merchandising information to the user.

19 Claims, 5 Drawing Sheets (56) References Cited

U.S. PATENT DOCUMENTS

| | | |
|---|---|---|
| 2007/0192294 A1 | 8/2007 | Ramer et al. |
| 2008/0281510 A1 | 11/2008 | Shahine |
| 2009/0089183 A1 | 4/2009 | Afram et al. |
| 2012/0059729 A1 | 3/2012 | Roa et al. |
| 2012/0084349 A1 | 4/2012 | Lee |
| 2013/0048710 A1 | 2/2013 | Marsico et al. |
| 2013/0332527 A1 | 12/2013 | Du et al. |
| 2014/0052551 A1 | 2/2014 | Bressan et al. |
| 2014/0073252 A1* | 3/2014 | Lee ................ H04M 1/72522 455/41.2 |
| 2014/0201001 A1 | 7/2014 | Rellas et al. |
| 2014/0258100 A1 | 9/2014 | Pasha et al. |
| 2014/0316869 A1* | 10/2014 | ONeill ............. G06Q 30/0209 705/14.12 |
| 2015/0242899 A1* | 8/2015 | Farhi ................ G06Q 30/0261 705/14.58 |

\* cited by examiner

SYSTEM AND METHOD FOR LOCATION AND TIME SPECIFIC MOBILE COMMERCE

CROSS-REFERENCE TO RELATED APPLICATIONS

This is a continuation application of U.S. patent application Ser. No. 14/261,227, filed Apr. 24, 2014, which claims priority to and benefit of U.S. Provisional Patent Application Ser. No. 61/816,567, filed on Apr. 26, 2013 entitled "Location Specific Mobile Commerce System and Method," the entire content of which is hereby expressly incorporated herein by reference.

FIELD OF THE INVENTION

The present invention relates generally to mobile commerce; and more particularly to a mobile application/service for location and time specific e-commerce.

BACKGROUND

Most people, including musicians and music enthusiasts, have had many frustrating and disappointing experiences with buying merchandise at live shows or events. They found the buying process to be generally inconvenient and requiring some planning ahead of time, ultimately taking away from at least some part of their viewing experience of the event. Fans are always burdened with having to decide which part of the show they're going to cut out and miss so that they can wait in line to buy merchandise related to the event. Then, the fans are stuck carrying around whatever they bought for the rest of the night, or risk losing it.

There are several problems fans are continually faced with when trying to buy merchandise at shows or other events. Often times, lines are long and waiting is undesirable, when a fan can be watching the show they paid to see instead. Even when the fan chooses to miss out on parts of the show to wait in long lines, products are usually sold out and the customer is forced to forgo buying the shirt she/he really wanted or settle on a size that doesn't fit. Other times, the vendor only accepts cash, leaving the customer who only brought a credit card unable to make a purchase. If the fans do successfully buy something, they are stuck carrying the items around for the rest of the night with the risk of accidently leaving them somewhere in the venue. Once the fans have left the venue, they no longer have access to the items on sale exclusively at the event. Also vendors must guess at the number and sizes of apparel that will sell at a specific event to plan for an appropriate inventory. These are problems that not only occur at live music events, but can be an issue for attendees to almost any live event where exclusive event-only merchandise is sold (for instance at a playoff game, a championship sporting event, a conference or training session, an invitation-only event, an amusement park or zoo, a museum or art gallery, etc.

Fans aren't the only ones experiencing problems when it comes to live event commerce; selling merchandise at shows is a less than seamless process for merchandise companies, labels and artists as well. When planning for a tour or show, artists and labels have to order a majority of the merchandise they plan to sell while on the road ahead of time. This means they usually have to estimate how much of each item they will need, leading them to have excess amounts of undesirable items and not enough of products in higher demand by the end of their run. At the same time, merchandise companies have to spend their time producing these products upfront using unnecessary amounts of materials, only leaving them to go to waste. With traditional methods of selling merchandise at live events, merchandise companies, labels and artists aren't reaching the optimal amount of customers because they are missing out on all the fans who choose to watch the show instead of wait in line to buy something. Not only are they missing out on these customers during the show, but once a fan leaves the show, they lose out on them as a customer altogether.

SUMMARY

The invention solves or alleviates these problems, giving live event fans extra convenience when it comes to purchasing merchandise. The need to wait in line is virtually eliminated (unless the purchasers want the item right then and there), and the fans don't have to carry the items, if they don't wish to do so, by signing up, making the purchase to be shipped to them (or reserving the purchase for pick-up at a later time).

In some embodiments, the present invention is a mobile application, which may be enabled via an exchange of text messaging, chat session, instant messaging interaction, web site order form, a web application or a phone conversation with a customer service representative.

In some embodiments, the present invention is a method for location and time specific commerce. The method includes receiving an event request from a user using a mobile device; verifying an account of the user; obtaining a location of the user; obtaining a date and time of the request; retrieving merchandising information from one or more databases, according to the location of the user and said date and time of the request; and transmitting said merchandising information to the user.

The method may further include receiving one or more items selected by the user from the transmitted merchandising information, and processing the received one or more selected items for a purchase by the user.

In some embodiments, the present invention is a method for location and time specific commerce. The method includes receiving an event request from a user; verifying an account of the user; obtaining a location for the user, and a date and time for the request; determining exclusive merchandise available for said location, date and time; identifying a merchandising owner/licensee for said exclusive merchandise available for said location, time and date; retrieving said exclusive merchandising information from one or more databases, according to said location of the user and said date and time of the request; transmitting said merchandising information to the user; and enabling purchase of the exclusive merchandise by the use.

In some embodiments, the merchandising information is further retrieved or accessed based on a plurality of access rules stored in a database. The plurality of access rules may include one or more of how long after the event the merchandising information remain accessible for purchase, whether certain merchandising information is only to be available if the user's location is verified to be within a premium section of a venue for the event, and if the user has arrived at the event before a specified time.

DETAILED DESCRIPTION

In some embodiments, the present invention is a mobile application/service that leverages e-commerce, wireless and location technology to enable artists, sports teams, conference organizers, schools, other event organizers, merchandisers, and venues to offer exclusive event-only merchandise to verified attendees at live events. Attendees are empowered with the ability to enjoy the live event and shop for exclusive products available only to attendees through the convenience of their mobile phones from anywhere in the venue and at any time. The invention streamlines the purchasing experience, allowing fans and artists, for example, to focus their attention and time on the live performance rather than the inconvenience of standing in line to buy apparel, souvenirs and memorabilia.

In some embodiments, the present invention is a mobile application (app) that can be used at live shows by fans to purchase concert merchandise on their phones and have it shipped directly to their homes or any other location of their choosing. Merchandise companies, as well as the artists and labels they work with, can create customizable virtual stores for their tours and one-time events. One unique aspect of the invention is that only the fans who are physically at the venue during the show time will have access to the electronic store, allowing artists to create exclusive products only those customers can buy. With the creation of an online "attendee only" storefront, selling merchandise becomes a more cost-effective process, reducing the need to procure as much inventory upfront to have on hand at shows. There are also additional benefits for fans, as the app gives them the ability to purchase products from practically anywhere in the venue at any time, even from their seats. The invention gives fans the ability to never miss out on a moment of their favorite band's performance. Once verified to have been in attendance through wireless location capabilities of the fan's mobile phone or network provider, the invention can also provide "after show" offers of exclusive items as often and for as long as the seller desires, enabling additional revenue streams for the merchandise companies, artists, labels, promoters and venues.

Fans can access all the products they could have purchased at the merchandise table directly on their mobile phone and have them sent directly to their home or any other location of their choosing. There is also less risk of an item selling out, since items can be produced as they are ordered.

The invention gives the customer more options which can be displayed online compared to those that can be displayed in a limited space at the venue, the ability to purchase more items at once, and extra customization options such as, for example, adding their names or favorite song lyrics to an item or choosing the color shirt they want. In addition to more product options, fans are also given more payment options, with the ability to pay with their credit card and other electronic payment methods. What's even better is that the buying doesn't have to stop when the venue closes; if the customer verifies they were at the event, they'll have access to all the event's exclusive products for some time thereafter and any additional attendee-only offers that a merchandiser, artist or venue operator may desire to offer.

Frequently, concert or show tour-specific merchandise is required by promoters to only be available for sale at their venues. The invention provides an electronic method to comply with these restrictions while allowing artists to reach a broader customer base and customers to access the restricted merchandise more conveniently (and for a longer period of time). This gives venue operators, merchandisers and artists the opportunity to achieve greater sales from each event or tour.

By utilizing the invention, merchandisers and artists are able to better gauge what their customers are buying and which products they need to produce and when. This reduces the risk of overproducing and being stuck with excess items that aren't going to be bought and saves them money. By giving the fans the ability to purchase their products from practically anywhere in the venue at any time, they are tapping into more customers, those who may not have wanted to wait in line to make a purchase. Having users make purchases from their mobile device also gives artists and labels another way to interact with their fans. Allowing fans to share their purchases via social media gets them to spread the word about the products through word-of-mouth and promoting the artist to a whole network of potential customers and fans. Since the app stays with the customer even after the show, it also gives the artist another way to keep them engaged and coming back to make additional purchases or receive updates on new releases, new shows/tours and other interesting information. Allowing customers access to their store after the show gives artists and labels the opportunity to offer "after-show" promotions for customers who were in attendance, driving additional sales and encouraging them to make larger purchases.

Figure 1:
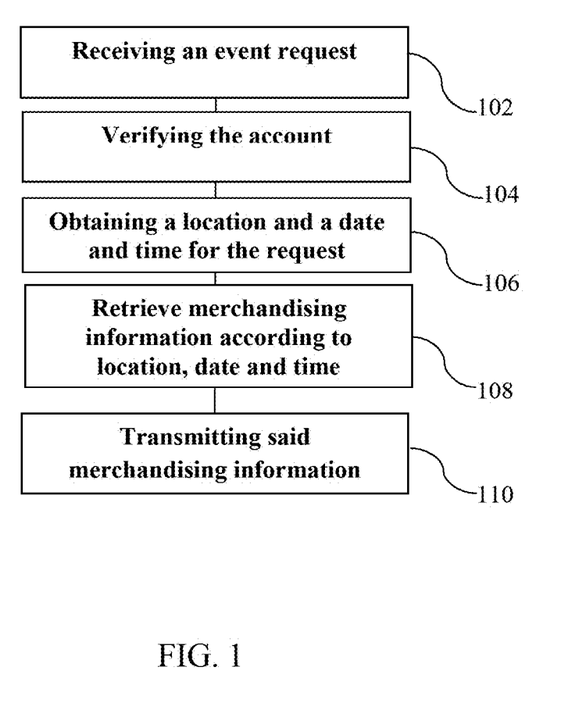
FIG. 1 is an exemplary simplified process flow, executed by one or more processor, according to some embodiments of the present invention.

FIG. 1 is an exemplary process flow, executed by one or more processor, according to some embodiments of the present invention. A shown in block 102, an event request is received from a user, who is attending an event. This may be accomplished using various methods, for example, selecting a button on an app on the user's mobile device, sending a text message, making a call, and the like. In block 104, the invention optionally verifies that the user making the event request has a valid account. If not, a message, which may include a URL to a website, may be sent to the user inviting her to sign up with the e-commerce service. Once the user's account has been verified or established, the invention obtains the location of the user using known methods such as, but not limited to, GPS, cellular network location, Wi-Fi access point identification, RF fingerprinting, trilateration, iBeacon or Bluetooth Low Energy (BLE) proximity detection, in block 106. The invention also obtains a date and time of the request (e.g., time-stamps). In some embodiments of the present invention, the process of verifying the user's location and time and date may be used to determine the associated venue and event via, for instance, a look up in one or more event databases to automatically register the user's event of interest.

In block, 108, the venue and event details for the verified location and time and date are looked up in one or more venue databases so that appropriate merchandise may be accessed for presentation to the user from the associated one or more merchandise owner/licensor and inventory databases. In some embodiments, the merchandise licensor or owner is determined for subsequent determination of authorized merchandise to be presented to the user and to facilitate post-purchase accounting, reconciliation and order fulfillment. For example, a merchandising owner/licensee may be identified for the merchandise available for the location, time and date of the event. The merchandise information that are related, associated or specific to the location, date and time of the event is retrieved from one or more databases, according to the location of the user and said date and time of the request. The various databases may reside in different locations and maintained by different companies/merchandisers. Communication among the databases and processors of the present invention may be enabled via a computer bus, a multi-computer backplane, a local area network, a private wide area network, and/or the internet. The invention then transmits the retrieved merchandising information to the user, in block 110, to be displayed or annunciated via the user's mobile device.

The user may then select one or more items from the displayed or annunciated information and send the selected items to the invention's e-commerce processor for further processing. A check is then made to determine if the user already has an account on the present invention's e-commerce system. If an account is verified for the user, the account of the user is checked for available funds or credit and a purchase request for the one or more selected items is processed. If no account is verified, the user may be asked to enter shipping, billing and payment information which is in turn verified via available payment processing services and the order for the selected items is processed.

In some embodiments, the location, time and date are validated against a database of scheduled events at the venue corresponding to the verified location of the user, at the time and date of said location verification, and thereby access to the merchandising information is enabled automatically, when the location, time and date are validated.

The above described process is executed by one or more processor, for example, mobile devices, smartphones, and/or server computers.

In some embodiments, in order for fans to use the invention at an event, they may download the invention's app on their mobile phone from a provider's app store or go to a website and download the app onto their mobile devices. Once they have downloaded the app and are at the invention's interface of the app, they will be able to login and create a profile using either their email or a social media account (e.g., Facebook™ or Twitter™). Upon creating an account, there are several options for entering an artist's store and verifying their location at an event (through their mobile phone and wireless network location technology).

These include, for example, Quick Response (QR) codes, Near Field Communications (NFC) technology, text messaging, URL, iBeacon or BLE proximity detection, and manual entry of event specific alphanumerical codes. Promotional materials placed throughout the venue may provide information for utilizing each of these options allowing the user to choose what works best for them. QR codes allow the user to take a photo or scan the code from the camera on their mobile phone, directing them to the specific store through an embedded link or a link obtained from a remote server upon presentation of the QR code image over the internet or other network communications medium. Upon scanning the code, the user's location would be verified, gaining them access to exclusive items/content. NFC technology would work in a similar way, allowing the user to tap their phone against a smart sign to verify they are at an event and, again, gaining them access to the event's exclusive invention store. iBeacon or BLE would do the same upon the user's phone that is equipped with Bluetooth capabilities coming into sufficient proximity of the said one or more iBeacon or BLE tag installed at the venue. Users may also be provided with an event-specific code that can be entered directly into the invention app, taking the user to the event's store within the app and verifying their location. Alternatively, the user may be presented with a list of available events within the application from which to choose and initiate their request upon selecting one of them.

In some embodiments, the location of the phone/mobile device may be validated and purchases may be made using text messaging (similar to text-based mobile giving programs), but this would be a mobile purchase program with location (and time) verification using cellular network-based location technology such as cell site identification, trilateration or assisted GPS. The user may choose to have the purchase billed to their phone account if their wireless carrier offers this billing option through providers such as Payfone™.

The same method could be applied to purchases made over the phone by calling a customer service agent or Interactive Voice Response (IVR) system. Location verification can allow the purchase over the phone to be handled, or routed to the order taking desk/system for the event automatically. However, it might be routed to a general order desk/system if the person is not at the proper venue. This system could also be used for contests at live events. For instance, the first n callers, texters, browsers or tweeters from the venue (at the right time and place) can compete to receive a prize/limited edition item or opportunity to buy such exclusive items only available to verified attendees at the event. A third party, such as a radio station, fan site, blog host, chat room, etc., could put on a contest by having users call or text their number and use the location and time verification to confirm they were actual attendees and thereby eligible to participate in contests for prizes. This allows others who want to gain promotional value from engaging people at the event to offer new programming and engagement options for greater viewership/listenership/visitorship.

One or more of a variety technologies may be used to locate the user. These include but are not limited to connectivity to a short range (e.g., Wi-Fi) transceiver located at the venue, proximity to iBeacon or BLE tags installed at the venue, trilateration and/or RF signature methods using one or more such Wi-Fi transceivers or tags, GPS, assisted GPS, or use of a cellular carrier's wide area location technology. The location step may include an explicit system request and user response for the user's permission to be located, or the permission may be given in a general manner in the user's account preferences, or as a part of the terms presented when purchasing their ticket for the event or other contract for attending the event or entering the venue.

Concert promoters also stand to gain from the use of the invention at their events and in their venues. Since each store or inventory of available merchandise is specific to an event and venue, the app can feature information about the promoter's future shows at their venues. It targets customers who they already know attend their events and encourages them to buy tickets for future events at the same venue or other venues they might own nearby. Since the promoter or venue owner typically takes a percentage of merchandise sales for allowing the artist to sell their products at their venue, they would be able to take a percentage from any sales made through the app at one of their events, providing them with additional revenue. Since there will be less of a need to have as much inventory on hand to sell at shows, they can free up more space for other revenue-generating and promotional activities in place of a merchandise table, kiosk or stand.

Figure 2A:
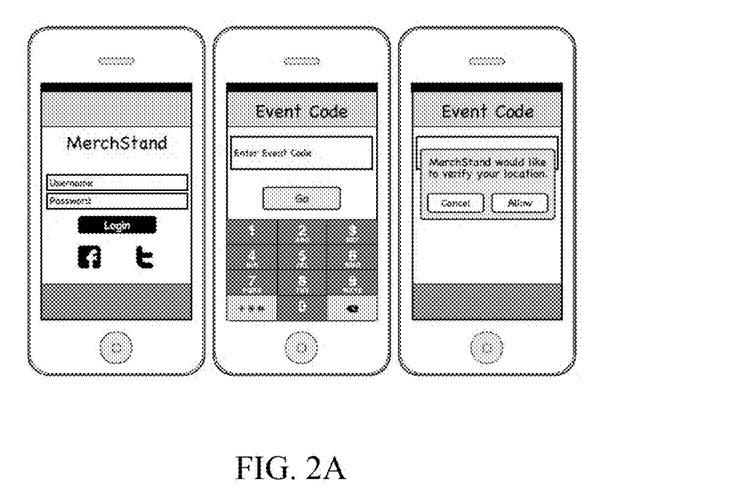
FIG. 2A illustrates some exemplary screen shots for signing up for an event, according to some embodiments of the present invention.
Figure 2B:
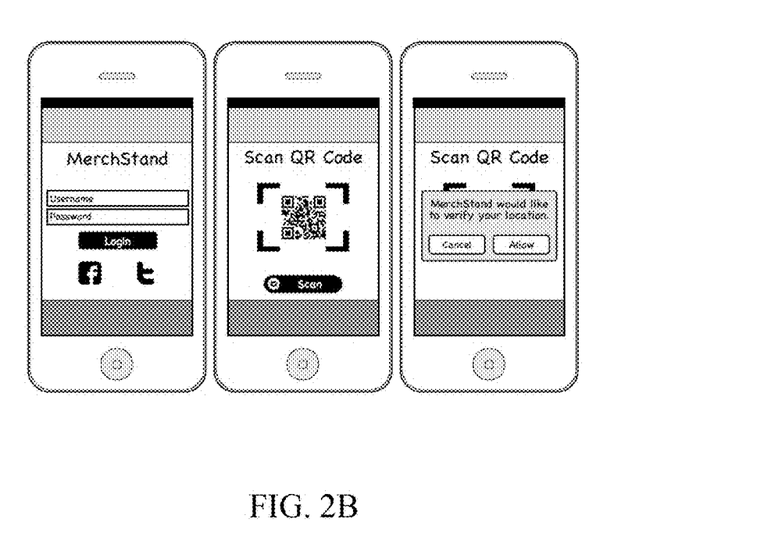
FIG. 2B shows some exemplary screen shots for obtaining a QR code and verifying the location, according to some embodiments of the present invention.

FIG. 2A illustrates some exemplary screen shots for signing up for an event and FIG. 2B shows some exemplary screen shots for obtaining a Quick Response (QR) code and verifying the location, according to some embodiments of the present invention.

The screen shots are of a mobile application using the invention to enable an attendee to log into their account, sign up for an event and have their location and time/date of request verified.

Each show, tour or event date and location/venue may receive its own unique event code that can be given to fans upon their arrival at the event. For example, there may be multiple similar events at the same time, but at different locations, or same events at the same location, but at a different time. Each of these events has its own unique event code, based on at least the location and the time. Upon verification of the location, date and time by the present invention, the event code or identity may be determined automatically when a single event is associated with a particular location, date and time. As shown, in FIG. 2A, once a fan who has signed up enters the event code into his/her mobile device or otherwise requests verification of their presence at the event, the app verifies his/her location to ensure that the fan is at the venue, within the given time period. After this verification, the fan will be granted access to the event's e-commerce screen via the app according to the present invention.

Alternatively, an attendee (fan) may scan a QR code to submit the event information to initiate location verification, as shown in FIG. 2B. The exemplary screen shots show a mobile application using the invention to allow an attendee to log into their account, scan a QR code and verify their time and location in relation to the associated event, according to some embodiments of the present invention. The attendee (fan) opens the app and points their camera at a QR code posted at the event or published in the program for the event to initiate the event request and location/time and date verification. Again, once location, date and time are verified, access to the e-commerce screen for the event associated with the scanned QR code is made accessible to the user.

Other methods, such as browsing to a website using a given URL, sending an SMS text message, or conducting a Near Field Communications (NFC) transaction may also be used. Near field communication is a set of standards for smartphones and similar devices to establish radio communication with each other or point of sale terminals by touching them together or bringing them into proximity. Likewise, iBeacon and BLE tags installed at a venue enable identification of smartphones nearby via an application on said smartphone or capabilities inherent in the smartphone operating system. Once the location, time and date are verified, the e-commerce functionality for the event is made available to the verified attendee via the present invention.

Figure 3A:
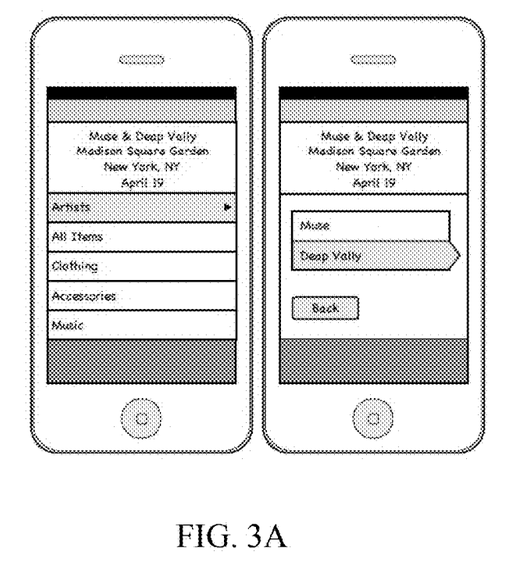
FIG. 3A depicts some exemplary screen shots for an event, according to some embodiments of the present invention.

FIG. 3A depicts some exemplary screen shots for an event, according to some embodiments of the present invention. The screen shots illustrate a mobile application using the invention for an event of a particular artist. In addition to a show, a concert, a play, the event may also be a conference run by a particular organizer, a class being offered by a particular school or instructor, a sporting event for a particular team, or any other time and location-specific situation in which an attendee or user might find themselves. As shown, upon the verification of the location and time and date, a screen specific to the event for the location and time is displayed on the fan's mobile device. The screen may display the detailed event description, the artists/performers involved in or with the event and items that can be purchased, such as clothing, accessories, music, video, posters, and the like. References to artist or performer may be substituted with team, team member, instructor, speaker, cast member, race car driver or any other role associated with any type of live events or venues to which the present invention may be applied.

Each event may have its own customized screens that will feature all available items for sale. In some embodiments, artists are also able to create their own customized stores within the main event page.

Figure 3B:
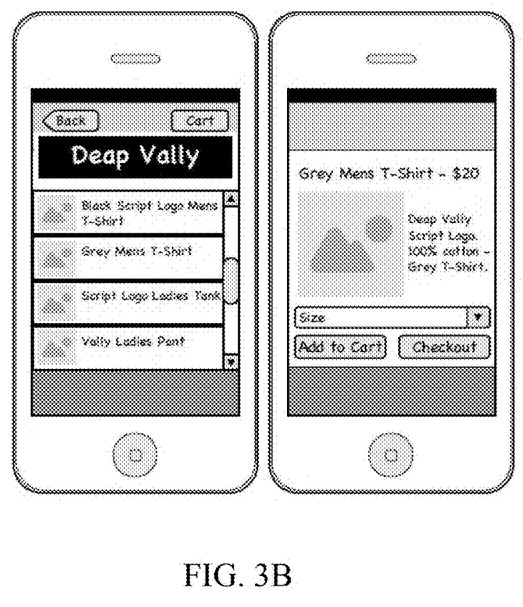
FIG. 3B illustrates some exemplary screen shots for browsing merchandize specific to an event, according to some embodiments of the present invention.

FIG. 3B illustrates some exemplary screen shots for browsing and selecting merchandise specific to an event, according to some embodiments of the present invention. The screen shots depict a mobile application using the invention enabling the user to browse merchandise specific to an event and made accessible to the attendee once time and location have been verified in relation to that of said event. Fans are able to sort through items, based on the type of product or artist, and easily add them to their cart. In addition to sizing options there are some opportunities for customization, such as allowing fans to add their name, initials, favorite song lyrics, team members or a selfie previously taken at the event to a product at an additional fee.

In this example, Deap Vally™ is selected as one of the artists related to the event at the specific venue and the clothing items for the artist is selected by the fan. The fan can then add an item to a cart and purchase it then, or save the selected item, for example, in the cart for purchasing at a later time.

Figure 4:
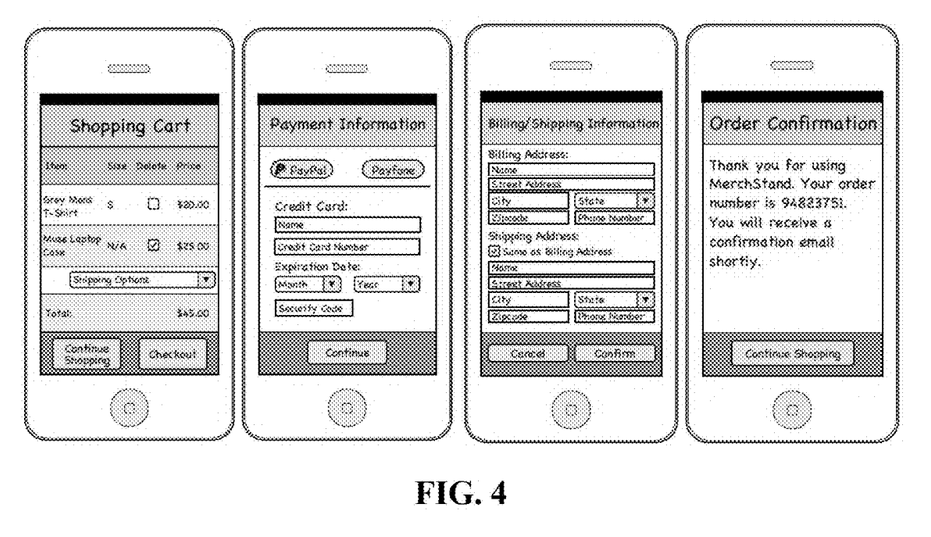
FIG. 4 shows some exemplary screen shots for purchasing merchandize specific to an event, according to some embodiments of the present invention.

FIG. 4 shows some exemplary screen shots for purchasing merchandise specific to an event, according to some embodiments of the present invention. The exemplary screen shots illustrate a mobile application using the invention for purchasing merchandise specific to an event after location and time verification, according to some embodiments of the present invention. If the user has a pre-set account, purchase, billing and shipping information can be retrieved from the user's stored profile.

At checkout, fans may be given several options for payment including PayPal™ and Payfone™, which store the user's payment and contact information. They may also be able to manually enter in their credit or debit card information themselves, if they so choose, or if they do not have a pre-established account. The location verification can also serve to confirm that proper sales taxes are accounted for and collected, thereby supporting the efforts of local governments to keep their budgets balanced. After completing this step, the products may be shipped directly to the user's place of choice.

As described above, the shopping cart may be saved in the fan's account for a later purchase. As shown, one or more of the shopping cart, payment information, billing and shipping information and order confirmation screens may be displayed to the fan on his/her mobile device. Additionally, once the attendee has been verified to be at the venue for the event, the e-commerce site may remain available for purchases made any time after the verified attendee leaves the venue, thus enabling extended buying time for attendees (such as on the train ride home or while reminiscing about the show the next day).

In some embodiments, merchandise companies, labels and artists can create a customized profile for their event or tour. In the case of a tour, for example, a show or concert tour, each tour date would get its own store that would be exclusively accessible by its live event attendees. The merchandise company may provide the invention with the product codes, images, prices and information for the items being sold at the show and that information would be uploaded onto the invention making those products available for purchase through the app. When fans use the invention's app, they can add the products they wish to purchase to their shopping cart and the items would be shipped directly to them. The merchandise companies would be able to view real-time data and better chart sales providing them with more accurate insight into their success. Likewise, they will be able to order product and stock items based on actual orders with less guess work, and therefore less shortage or overstock, and thereby greater profitability.

In addition to the creation of an event-specific attendee-only store, artists, labels and merchandise companies can create general stores that can be accessed via the invention by fans to purchase products from any place at any time. These products would be available in a section of the online store open to anyone through the app or the invention's website. This opens up the app to other fans who may not be able to attend a show, but still wish to purchase products from their favorite artists online. Then when they have the app, they can use it to access the exclusive section of the store if they attend any events.

In some embodiments, both users with or without a smartphone can utilize a text messaging option, allowing access to the invention without downloading the app. The user can send a text message to a specific number or short code (promoted at the venue and on the invention web site) to verify their location and then be allowed to specify which products they wish to order. Users may scan QR codes posted at the venue or in show programs for specific items or text in item codes and options of their choice. Billing can be through the user's carrier using services such as Payfone™ or to a pre-arranged credit card or electronic billing method set-up in a user account on the invention's system beforehand. The account settings also link the user's phone number to the account.

The use of text messaging also opens up opportunities for users to purchase items after the event. By verifying the user was at the event via any of the methods described above, the system can respond with a promotional code that can be used on the event's general store that can be accessed by anyone at any time (after they have been verified). This promotional code can be used to access exclusive tour items on the website after the show or to gain special discounts on items in the store. Users will also be able to access the specific store via their web browser, taking them to the invention website where they will have the option to download the app or proceed with shopping in their browser.

Fans without data plans or text messaging plans could also check in by calling a phone number publicized at the event, have their location verified and receive a promotion code verbally. Then when they get home or at another location where they could get online, they can enter the code to get access to the event-specific store and place an order because they were verified to be at the show (right time and place) when they called.

In some embodiments, the present invention is integrated with a variety of different social media sites and functions, such as Facebook™ or Tweeter™. With social media integration, fans are able to tweet or share their purchases directly from the invention app, providing further word-of-mouth promotion for artists, labels and tours. The use of social media also allows for check-in features, giving the artists and labels the ability to create exclusive content that only the attendees have access to. Fans can also see who else is at the show that they might know, where they are (if they allow sharing of each other's location), and what they've bought. The invention also allows artists to offer customized products, which can be tailored at the time of purchase, giving fans the opportunity to obtain personalized items.

Aside from the music industry, the invention also has the potential to move into other industries that utilize live events. Sporting events would be a major point of interest for instance. With weekly events and loyal fan bases, sports teams could utilize the app to provide exclusive content or contests for game attendees. Since these fans often come back week after week, there is a great opportunity to keep users involved and engaged in the invention app.

Other events or venue-specific events such as fairs, zoos and amusement parks could use the capabilities. For instance, visitors to Disneyland™ at a certain time could gain access to special offers on the Disney™ online store because they are at the park. Often items are made available only to visitors, but these are typically small and of minor value. Online participation opens up the possibilities, thereby making purchases of potentially higher value, size and quantity than they might purchase at the venue with the convenience of having it shipped to their home without risk of loss or breakage while enjoying the park. Zoos, race tracks, ski resorts, and many other venues can take advantage of creating exclusive attendee-only, time-limited attendance offers and products raising the exclusivity and value of items available for purchase online.

Additional uses of the invention include participation of a user in a raffle or other program that requires user to be present to win. The user's phone may be used as an indicator that he/she is present at the required venue during the specified time.

Moreover, users that check pricing online from competitors while shopping in a brick and mortar retail store could be presented with special pricing because they are at the physical store which people not present at the store might not have access to. This can drive people to come to the store to get the best price, or if used online by a competitor, to detect that a user is at a competitor's store and encourage them to buy online (by getting an extra discount because the app detects they are already at a competitor location). When show-rooming, a user reviews a product in person at a store and searches for the product online to look for better pricing than is available at the retail outlet itself. The merchant in whose store the user is located could use the knowledge that the user is located at their store (via free Wi-Fi access, for instance) and detect that the user is searching for a particular product, as described in the terms of use presented for gaining free Wi-Fi access.

The merchant could attempt to dissuade the user from purchasing the item online at a competing merchant's web site by presenting the lowest price or providing another item available in the store (that happens to be in excess inventory)

for free or a very low price as an added incentive to purchase on site the item that had been searched for online. When entering a product description or code within a store for a product and checking its price online, a competitor's web site could detect the user's location and realize that the user is at the competitor's store. This could trigger similar inducement by the competitor to entice the user to buy from their online store or go over to their nearby store, with directions, instead and buy locally.

In some embodiments, when shopping in a store, the user can scan a product's barcode on their mobile device providing them with additional information about the item. When accessing this information in the store, companies can offer the user special discounts, additional promotional items or coupons to use if they purchase the item online while in the store. Additionally, if the user is in competitor's store and scans a product's barcode, the company can offer the user a discount for a similar or related item if they purchase the item online from them instead of from the competitor.

In some embodiments, by utilizing user information stored in the cloud, companies would be able to track what products users are researching or interested in through their search history and social media activity (e.g.: Twitter™ feed, Facebook™ timeline, etc.) at or around specific retail locations or across geographic areas.

For examples looking at the user's Twitter™ profile, companies can see who the person is following and what information they are tweeting about and where they are tweeting from. With this information, the company can target this user for specific promotions. Also, the combined information from all users in an area can be used to provide and target offers and products of greatest interest to that area's residents/searchers. For instance, if Best Buy™ sees that a user is looking for a new computer and follows Apple™, they can target this user and send them promotional offers for a related item, encouraging them to buy the product from them rather than the competition. If they see that many users in the same area prefer Apple™ over Windows™, or a particular model of Apple™ products, they can plan purchasing, advertising and future promotions in that area around this insight. The offer could consist of something like "Come to Best Buy™ between 10 AM and noon on Saturday and you'll receive 15% off a new HP Surface™."

As another example, Google™ could utilize a user's information in the cloud by tracking their searches and then targeting them with related coupons from sponsored companies. If they noticed a user searching for a new vacuum cleaner and they are looking at Dirt Devil™ and Dyson™ options, Dyson™ could send them a related coupon offering them a discount on one of their products from a nearby (or the nearest) retail location/merchant.

Additionally, the order can be placed through a browser by a user visiting a web site for the event with location verified as previously described for the text or call use cases. Location could be determined through any means available to the browser on the mobile device. A web site can automatically redirect the user to a general store web site if the user is not at the proper location during a specific time before, during and/or after the event. A user can access event-specific store web site only if at the proper venue during the specific or approximate time of the event.

These options could also extend past the given time frame if the user verifies their location via visit to the web site, making a call or sending a text while at the event or given location within a prescribed time frame. Upon verifying they are in attendance, they will receive a special promotional code that can be used at any time on the company's general website. Once the code is entered, the user will be able to access special offers or products available only to those who attended the event or were at a specific location at a certain time. This will also drive users to the company's main website, encouraging additional purchases of items that are available to all customers at any time.

Figure 5:
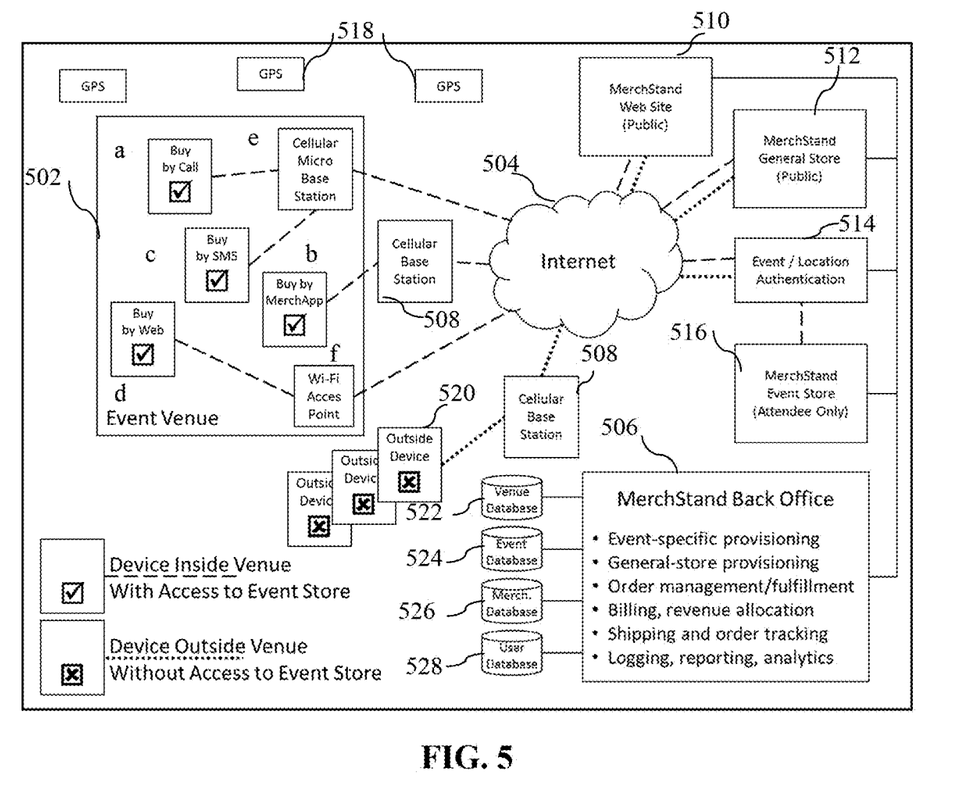
FIG. 5 is an exemplary system block diagram, according to some embodiments of the present invention.

FIG. 5 shows an exemplary system block diagram, according to some embodiments of the present invention. At an event venue 502, fans can buy by call (502a), buy by merchant app (502b), buy by SMS (502c), or buy by web (502d), using Wi-Fi access points 502f and/or cellular micro base station(s) 502e for communication from their mobile device. For example, some fans use a mobile device with the invention's app loaded thereon. Others are phones using SMS, Call or Web to make the purchase without the application. Wi-Fi access points 502f, GPS 518 and cellular network base stations 508 and 502e are shown to indicate that the location determination may be by any means available based on the user's cellular phone network capabilities, device capabilities, visibility to satellites for GPS, and/or Wi-Fi services available at the venue. These location determination methods are provided as examples and not intended to be exhaustive and other means could be employed. Users with devices detected outside the venue (520) or whose location cannot be verified and therefore presumed to be outside the venue for the purpose of verification, would be denied access to the event store.

If a user is connected to the Wi-Fi in the venue, that can create an automatic authentication simply by virtue of being connected to the Wi-Fi network, or his/her device being received with a signal strength or communication time delay being within a specified range, with location determination as a secondary factor, and vice versa. The system also authenticates user account information using industry standard electronic commerce methods such as username and password to manage account access and user identity to ensure that purchases, payment details and other personal information are protected and secure.

Users access services from the e-commerce site via their mobile devices which are interconnect through their network service providers to the web site e-commerce servers via the internet (504). Those site visitors who are not verified to be at the event are directed to a public web site (510), whereas those that have been verified to be at the event by the event location authentication processor(s) (514) are granted exclusive access to the event web site (516). The e-commerce back end systems (506) are implemented on one or more servers with processors that access the databases used to manage access and present appropriate content. User location, date and time data is compared against venue and event details stored in the venue database(s) (522) and event database(s) (524).

The venue database contains venue location details including boundary map data outlining the perimeter of the venue as well as venue profiles such as owner, merchandise licensees, network installations, Wi-Fi access point identity data, iBeacon tag installation locations, etc. The event database contains details about artists, performance schedules, attendee lists, merchandise licensors and owners, and other details against which event codes, time, date and attendee's account credentials are compared for verification. Once verified, merchandise databases (526) are accessed to obtain the list and associated details of merchandise available for each venue/event. The user database (528) contains user profiles, secure login credentials (username and password), payment and shipping details, event registration, preferences and historical usage activity.

These and other components of the system use typical wireless, internet and electronic commerce capabilities with the addition of a location verification/authentication function (514) that serves as a logical firewall between user requests and the event-specific store site. Only those users who are at allowed venues and within acceptable times will be granted access to the event-specific store/items/content/prices.

Figure 6:
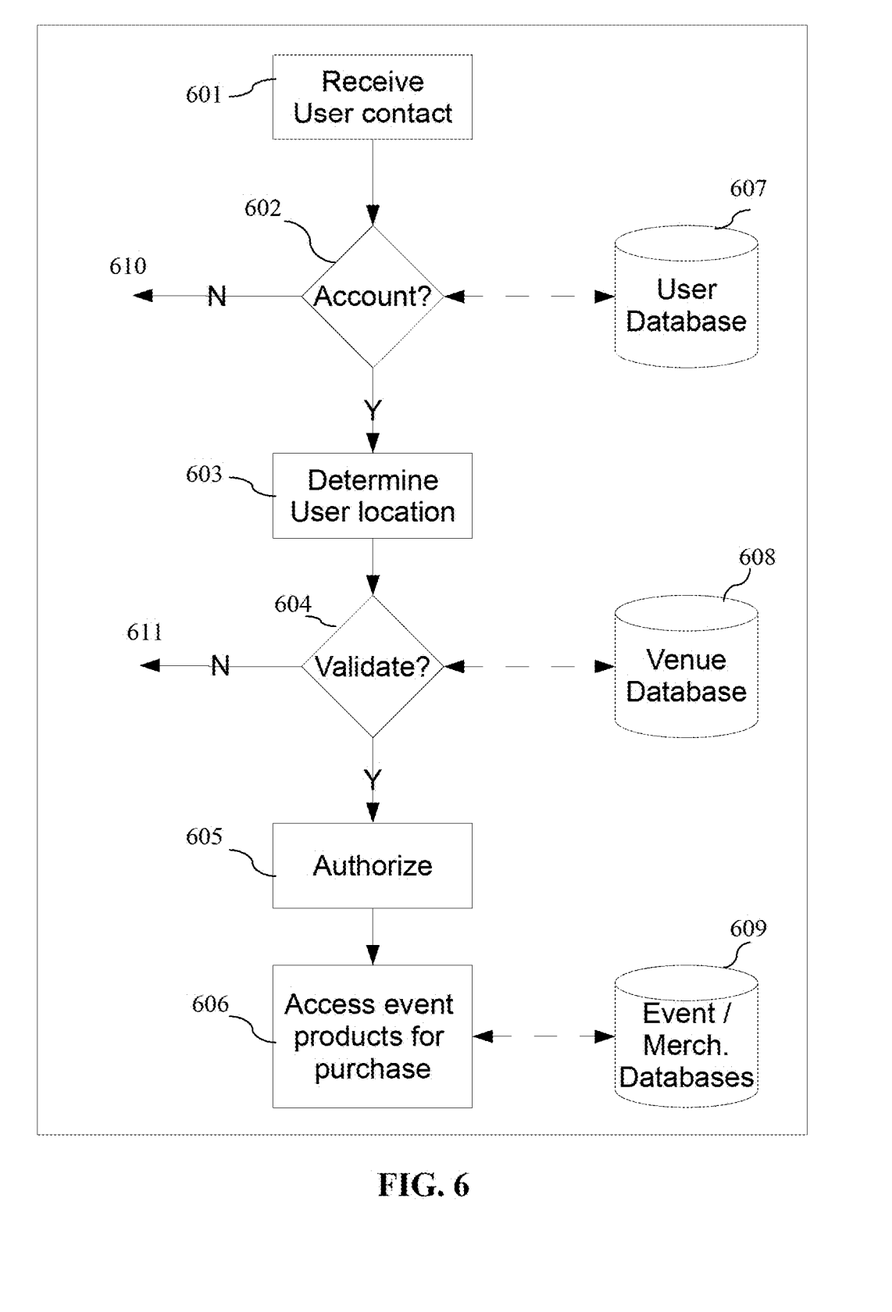
FIG. 6 illustrates an exemplary processing flow performed, according to some embodiments of the present invention.

FIG. 6 illustrates an exemplary process flow performed by one or more processors, according to some embodiments of the present invention. As shown, in block 601, the invention receives contact (and other) information from a person (fan) wanting to use the invention, through any of various means. In block 602, the invention verifies if the person is a registered user with a pre-established account, via a user database 607. The user database 607 may include some or all of the following information: user ID, username and password, contact information (e.g., email, phone number, etc.), billing information, product preferences (e.g., size, color, etc.), shipping preferences (e.g., address, method, etc.), order history and status, communication/offer preferences, and the like.

If the person is not a registered user (610), the invention may offer the person the option to set up an account, visit the public storefront, etc. In block 603, the invention determines or validates the user's current location. This may be through wireless means (e.g., cellular, Wi-Fi), event code, QR code, NFC, iBeacon, BLE or other known methods.

In block 604, the present invention validates that the user is at a currently-active event, through access to an event/venue database 608. If the user is not at an event (611), the user may be directed to the public storefront, offered account establishment options, directions to nearby or upcoming venues and events, etc. The event/venue database 608 may include some or all of the following information: venue ID, venue location code, venue name, venue address, venue boundary/shape file, center point/boundary coordinates, buying and access rules (e.g., during show only, during and after show, off-site for two hours after show, etc.), and the like.

The verified user location is compared against stored venue boundary/shape file depicting the physical dimensions or outline for the venue and the authorized areas of the venue within which the user location must be contained to be considered authorized. These boundary or shape files may include the venue building, but exclude the parking areas, for example. For venues that may contain multiple stages and/or performance areas, an overall boundary file may be used to verify the user location and a center point and radius may be configured to encompass each performance site within the venue (for instance specific auditoriums, stages, and/or rooms). This may be used to present different merchandise to the user based on their specific location within the venue. Such additional venue shape files may also be used to distinguish premium admission areas form general admission areas, and thereby present different merchandise access options.

If the user is at an event, in block 605, the user is authorized for any privileges, including buying and browsing privileges, associated with that event. Optionally, one or more merchandising owner/licensee may also be identified for the merchandise available for the location, time and date of the event. Once the user is authorized for an event, in block 606, the user has access to purchase any products associated with that event, as found in the event's merchandise database(s) 609. An event database may include some or all of the following: Event ID, venue location(s) ID(s), location code(s), date(s)/time(s), buying and access rules, artist information, associated products, and the like. Access rules may include how long after the event merchandise may remain "open" (accessible) for purchase. Likewise, access rules may include whether certain content may only be available if a user's location is verified to be within a "premium" section of the venue, etc. or if the user has arrived before a specified time (for an "early bird" promotion, for instance).

A merchandise database (609) may include some or all of the following: product ID/SKU, event/venue ID(s), product descriptions, sizes, colors and variants, customization options, shipping options, payment options, price, availability, reviews and ratings, and the like.

In some embodiments, these databases are constructed and maintained prior to operation, and during on-going operation of the invention.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for location and time specific commerce comprising:
   receiving an event request from a user using a mobile device, over a wireless connection to a computer network, by a server computer;
   obtaining a location of the mobile device communicating with a wireless transceiver, by detecting signals from one or more of iBeacons, Bluetooth low energy (BLE) tags, and locally-installed Bluetooth-enabled devices;
   obtaining a date of the request;
   retrieving merchandising information from one or more databases, according to the location of the mobile device and said date of the request;
   transmitting said merchandising information to the mobile device to be displayed on the mobile device;
   validating the location and date against an authorization database; and
   enabling access to said merchandising information, when the location and date are validated, wherein the method is performed by one or more processors.

2. The method of claim 1, further comprising: receiving a selection of one or more selected items from the user based on the transmitted merchandising information; and processing the received one or more selected items.

3. The method of claim 2, wherein processing the received selection of one or more items comprises: verifying the account of the user for available funds or credit; and finalizing a purchase request for the received selection of one or more items.

4. The method of claim 1, wherein retrieving merchandising information is further based on a plurality of access rules stored in a database.

5. The method of claim 4, wherein the plurality of access rules include one or more of how long after the event the merchandising information remains accessible for purchase, whether certain merchandising information is to remain available only if location of the user is verified to be within a premium section of a venue for the event, and if the user has arrived at the event before or after a specified time.

6. The method of claim 1, wherein the event request is generated by one or more of the following: sending a text message by the user indicating the user's arrival at the location, sending an email by the user, selecting a button within an application by the user, placing a phone call by the use, coming into proximity of a specified Bluetooth beacon or Wi-Fi access point, and scanning a Quick Response (QR) code posted at the event.

7. The method of claim 1, wherein the event request is generated automatically from an application executing on the mobile device upon user's arrival at the location.

8. A method for location and time specific commerce comprising:
   receiving an event request from a user using a mobile device, over a wireless connection to a computer network, by a server computer;
   obtaining a location for the mobile device communicating with a wireless transceiver, by detecting signals from one or more of iBeacons, Bluetooth low energy (BLE) tags, and locally-installed Bluetooth-enabled devices;
   determining exclusive merchandise available for said location;
   retrieving information about said exclusive merchandise from one or more databases, according to said location of the mobile device;
   transmitting said merchandise information to the mobile device to be displayed on the mobile device; and
   enabling purchase of the exclusive merchandise by enabling selection of the exclusive merchandise by the user, when an account of the user is verified, wherein the method is performed by one or more processors.

9. The method of claim 8, further comprising: receiving a selection of one or more selected items from the user based on the transmitted merchandising information; and processing the received selection of one or more items.

10. The method of claim 9, wherein processing the received selection of one or more items comprises: verifying the account of the user for available funds or credit; and finalizing a purchase request for the received selection of one or more items.

11. The method of claim 9, wherein retrieving said exclusive merchandising information is further based on a plurality of access rules stored in a database, and wherein the plurality of access rules include one or more of how long after the event the merchandising information remain accessible for purchase, whether certain merchandising information is only available if location of the user is verified to be within a premium section of a venue for the event, and if the user has arrived at the event after or before a specified time.

12. The method of claim 8, further comprising: storing said exclusive merchandising information for a purchase by the user at a later time.

13. The method of claim 8, further comprising: validating the location against an authorization database for a user's account and enabling access to said exclusive merchandise information, when the location is validated.

14. The method of claim 13 further comprising following validation of the location, transmitting additional information related to other exclusive merchandises.

15. The method of claim 8, wherein the event request is generated automatically from an application executing on the mobile device upon user's arrival at the location.

16. The method of claim 8, wherein the event request is generated by one or more of the following: sending a text message by the user indicating the user's arrival at the location, sending an email by the user, selecting a button within an application by the user, placing a phone call by the use, coming into proximity of a specified Bluetooth beacon or Wi-Fi access point, and scanning a Quick Response (QR) code posted at the event.

17. A method for location and time specific commerce comprising:
   receiving an event request from a user using a mobile device, over a wireless connection to a computer network, by a server computer;
   obtaining a location of the mobile device communicating with a wireless transceiver, by detecting signals from one or more of iBeacons, Bluetooth low energy (BLE) tags, and locally-installed Bluetooth-enabled devices;
   obtaining a date and time of the request;
   retrieving merchandising information from one or more databases, according to the location of the mobile device and said date and time of the request;
   transmitting said merchandising information to the mobile device to be displayed on the mobile device; and
   wherein retrieving merchandising information is further based on a plurality of access rules stored in a database, and wherein the plurality of access rules include one or more of how long after the event the merchandising information remain accessible for purchase and if the user arrived or is present at the event, before or after a specified time.

18. The method of claim 17, wherein the event request is generated automatically from an application executing on the mobile device upon user's arrival at the location.

19. The method of claim 17, wherein said receiving an event request comprises receiving a scanned Quick Response (QR) code posted at the event from the mobile device.

* * * * *